ize patent

2,917,507
SYNTHESIS OF STEROIDS

Klaus G. Florey, Westfield, N.J., assignor to Olin Mathieson Chemical Corporation, New York, N.Y., a corporation of Virginia No Drawing. Application October 25, 1956
Serial No. 618,185

1 Claim. (Cl. 260—239.5)

This application is a continuation-in-part of my parent application, Serial No. 594,081, filed June 27, 1956, and now abandoned.

This invention relates to the synthesis of steroids and, more particularly, to a new selenium-containing steroid derivative of $\Delta^4$-cholesten-3-one.

The new steroid of this invention is 6$\beta$,19-seleno-$\Delta^{1,4}$-cholestadiene-3-one. This new steroid is useful as a fungicidal agent and, hence, can be used in lieu of, and in the same manner as, known fungicidal agents, such as thymol or ethyl vanillate. Thus, it may be used against agricultural pathogens, such as Cerastomella ulmi, Aspergillus niger and Penicillium expansum, in any suitable organic solvent, either in solution or suspension; and it may be applied, for example, as a spray.

The new steroid is prepared by heating $\Delta^4$-cholesten-3-one with selenium dioxide, preferably in a suitable organic solvent for the steroid reactant, which is unattacked by selenium dioxide under the reaction conditions empolyed. Suitable organic solvents include ethers (e.g., dioxane), tertiary alcohols (e.g., tert-butanol), acid anhydrides (e.g., acetic anhydride), and preferably organic acids (especially liquid lower fatty acids, such as acetic acid). The reaction is carried out at an elevated temperature, such as one in the range of about 80° C. to about 140° C. (optimally at reflux of the organic solvent, if one is used). At least one mole of selenium dioxide per mole of $\Delta^4$-cholesten-3-one is required for the reaction, but preferably an excess (about 3 to 4 moles) is used.

The product formed is 6$\beta$,19-seleno-$\Delta^{1,4}$-cholestadiene-3-one and can be represented by the structural formula

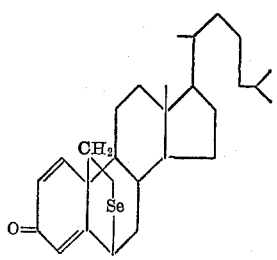

The new 6$\beta$,19-seleno-$\Delta^{1,4}$-cholestadiene-3-one of this invention can also be employed as an intermediate in the preparation of $\Delta^{1,4}$-cholestadiene-3-one. This conversion can be effected by either of two methods. Employing one of the alternative procedures, 6$\beta$,19-seleno-$\Delta^{1,4}$-chloestadiene-3-one is heated with a pyrophoric form of nickel (e.g., Raney nickel). According to the other alternative procedure, 6$\beta$,19-seleno-$\Delta^{1,4}$-cholestadiene-3-one is pyrolized by heating to a temperature of about 300° C. to about 500° C. (optimally about 350° C. to about 370° C. in vacuo) to yield $\Delta^{1,4}$-cholestadiene-3-one.

The following examples illustrate the invention:

EXAMPLE 1

6$\beta$,19-seleno-$\Delta^{1,4}$-cholestadiene-3-one

A mixture of 2.0 g. of $\Delta^4$-cholestene-3-one and 2.0 g. of selenium dioxide in 40 ml. of acetic acid is refluxed for one hour, cooled to room temperature and filtered from selenium. The filtrate is diluted with chloroform and washed with water and sodium bicarbonate solution. The solvent is evaporated in vacuo. From the resulting residue, about 344 mg. of a crystalline material, M.P. about 165–187° C., is obtained, which after recrystallization from ether-methanol yields 6$\beta$,19-seleno-$\Delta^{1,4}$-cholestadiene-3-one; M.P. about 187–188° C.; $[\alpha]_D^{25}$ +251° in chloroform;

$\lambda_{max}^{alc.}$ 244 m$\mu$ ($\epsilon$=10,200); 257 m$\mu$ ($\epsilon$=10,300); 305 m$\mu$ ($\epsilon$=1,280); $\lambda_{max}^{Nujol}$ 6.08$\mu$, 6.16$\mu$, 6.26$\mu$ ($\Delta^{1,4}$—3—keto)

Analysis.—Calculated for $C_{27}H_{40}OSe$ (459.55): C, 70.56; H, 8.77; Se, 17.18. Found: C, 70.76; H, 8.92; Se, 17.63.

EXAMPLE 2

$\Delta^{1,4}$-cholestadiene-3-one

To 200 mg. of 6$\beta$,19-seleno-$\Delta^{1,4}$-cholestadiene-3-one in 15 ml. of benzene, there is added 3 g. of Raney nickel in 6 ml. of ethanol. The mixture is refluxed for five hours, filtered from nickel, washed with water and concentrated to dryness in vacuo. The resulting resin is chromatographed on alumina. Fractions obtained with hexane-benzene solvent mixtures in order of elution are: (a) crystalline mixtures of $\Delta^4$-cholestene-3-one, cholestane-3-one and/or coprostane-3-one; and (b) $\Delta^{1,4}$-cholestadiene-3-one, M.P. about 108–110° C.; $[\alpha]_D^{28}$ +29.3°; $\lambda_{max}^{EtOH}$ 244 m$\mu$ ($\epsilon$=12,500); $\lambda_{max}^{Nujol}$ 6.01$\mu$, 6.15$\mu$, 6.24$\mu$ ($\Delta^{1,4}$—3—keto)

Analysis.—Calculated for $C_{27}H_{42}O$ (383.63): C, 84.75; H, 11.07. Found: C, 84.62; H, 10.92.

EXAMPLE 3

$\Delta^{1,4}$-cholestadiene-3-one

A total of 500 mg. of 6$\beta$,19-seleno-$\Delta^{1,4}$-cholestadiene-3-one is heated to 350–370° C. at 1 mm. pressure of mercury for 30 minutes. The reaction mixture is diluted with chloroform, filtered from selenium, washed with water and concentrated to dryness in vacuo. The residue is chromatographed on alumina. Fractions obtained with hexane-benzene solvent mixtures in order of elution are: (a) $\Delta^{1,4}$-cholestadiene-3-one, M.P. about 108–110° C., identical with authentic material, and (b) crystalline mixtures of $\Delta^{1,4}$- and $\Delta^{4,6}$-cholestadiene-3-ones, identified by two ultraviolet absorption maxima at 244 and 285 m$\mu$ (in ethanol; c.f. Wilds and Djerassi, J. Am. Chem. Soc. 68, 1712 (1940)).

I claim:
6$\beta$,19-seleno-$\Delta^{1,4}$-cholestadiene-3-one.

References Cited in the file of this patent

Chemical Soc. J. 1938, page 355.
Meystre et al.: Helv. Chim, Acta, 1956, 39, 734.
Ringold et al.: J. Org. Chem., February 1956, 21, 239.
Szpilfogel et al.: Rec. Trav. Chim des Pays Bas, May 1956, 75, 475.
Schwank et al.: Arch Biochem. 14, 125 (1947).